United States Patent [19]

Demlow

[11] Patent Number: 4,787,431
[45] Date of Patent: Nov. 29, 1988

[54] FLAIL APPARATUS

[76] Inventor: Ronald D. Demlow, 6600 S. Shore Dr., Weidman, Mich. 48893

[21] Appl. No.: 212,296

[22] Filed: Jun. 27, 1988

[51] Int. Cl.[4] .................................................. B27L 3/00
[52] U.S. Cl. ..................................... 144/341; 144/2 Z; 144/208 J; 144/343
[58] Field of Search ................ 144/208 R, 208 J, 2 Z, 144/341, 343

[56] References Cited

U.S. PATENT DOCUMENTS

| | | | |
|---|---|---|---|
| 2,792,860 | 5/1957 | Watkins | 144/208 J |
| 2,831,317 | 4/1958 | Watkins | 144/208 J |
| 2,893,451 | 7/1959 | Dickerson | 144/208 J |
| 2,994,352 | 8/1961 | Johnson | 144/208 J |
| 3,633,638 | 1/1972 | Groves | 144/3 D |
| 3,862,653 | 1/1975 | Fay | 144/208 J |
| 4,023,604 | 5/1977 | Stadnick | 144/2 Z |
| 4,061,166 | 12/1977 | Larson | 144/2 Z |
| 4,172,481 | 10/1979 | Brisson | 144/208 J |
| 4,214,616 | 7/1980 | Brisson | 144/208 J |
| 4,220,184 | 9/1980 | Hallett et al. | 144/2 Z |
| 4,572,258 | 2/1986 | Mischel | 144/208 J |
| 4,640,325 | 2/1987 | Vaders | 144/208 J |
| 4,690,187 | 9/1987 | Schmidt | 144/340 |
| 4,711,280 | 12/1987 | Schmidt | 144/208 J |
| 4,719,950 | 1/1988 | Peterson et al. | 144/208 J |
| 4,738,292 | 4/1988 | Turpeinen | 144/208 J |

Primary Examiner—W. Donald Bray
Attorney, Agent, or Firm—Ian C. McLeod

[57] ABSTRACT

A flail type apparatus (10) for removing limbs and/or bark from trees (101) by dragging the trees through the apparatus with a skidder (100) is described. In particular, drum 15 and 23 are mounted on the apparatus such that there is an opening A leading to space B between the drums allowing rotating chain flails 19 and 26 mounted on the drums to remove the bark and/or limbs.

19 Claims, 4 Drawing Sheets

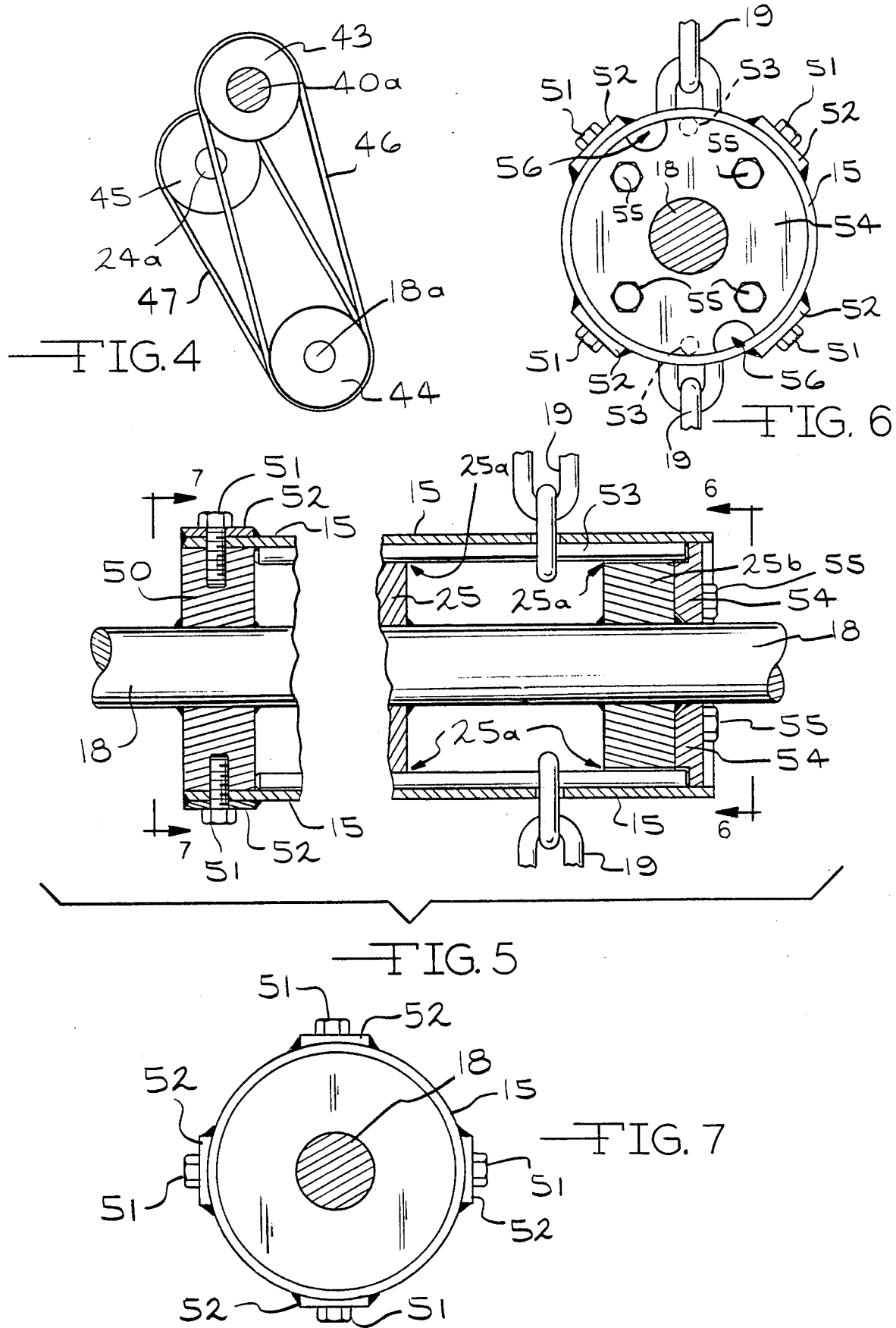

FLAIL APPARATUS

BACKGROUND OF THE INVENTION

(1) Field of the Invention

The present invention relates to an improved flail apparatus for limb and/or bark removal from trees. In particular, the present invention relates to an apparatus wherein a claw type skidder can be used to drag the trees through the apparatus.

(2) Prior Art

Flail apparatus, particularly chain flail apparatus, are well known to those skilled in the art and are described in U.S. Pat. Nos. 2,792,860 to Watkins; 2,831,317 to Watkins; 2,893,451 to Dickerson; 2,994,352 to Johnson; 3,862,653 to Fay; 4,023,604 to Stadnick; 4,061,166 to Larson; 4,172,481 to Brisson; 4,214,616 to Brisson; 4,220,184 to Hallett et al; 4,572,258 to Mischel; 4,640,325 to Vaders; 4,690,187 to Schmidt and 4,711,280 to Schmidt. A knife type delimber is shown in U.S. Pat. No. 3,633,638 to Groves.

In most instances, supplying the trees to the flail apparatus requires relatively complex feeding means. In other instances, the apparatus is designed to ride over the trees for limb and/or bark removal. In any event, the feeding means are part of the apparatus thereby committing the feeder means to a single purpose (i.e. to feed the chain flails).

OBJECTS

It is therefore an object of the present invention to provide a flail apparatus wherein the threes can be dragged between the flails for limb and/or bark removal using a common tree skidder, a vehicle which has a claw mounted on a boom which grasps a tree or trees for movement from one point to another in the forest. Further, it is an object of the present invention to provide an apparatus which is simple and relatively economical to construct. These and other objects will become increasingly apparent by reference to the following description and the drawings.

IN THE DRAWINGS

FIG. 1 is a front view in partial section of the limb and/or bark removal apparatus 10 of the present invention particularly showing an opening A and space B between drums 15 and 23 supporting chain flails 19 and 26.

FIG. 2 is a right end view of the apparatus 10 shown in FIG. 1 particularly showing the position of the drums 15 and 23 and an idler roller 27.

FIG. 3 is a cross-sectional view along line 3—3 of FIG. 1 showing the mounting of one end of the drums 15 and 23.

FIG. 4 is a cross-sectional view along line 4—4 of FIG. 1 showing the arrangement of pulleys 43, 44 and 45 with belts 46 and 47.

FIG. 5 is a partial front cross-sectional view of the drum 15 showing the attachment of the chains 19.

FIG. 6 is a right end view along line 6—6 of FIG. 5.

FIG. 7 is a left end view along line 7—7 of FIG. 5.

Figure 8:
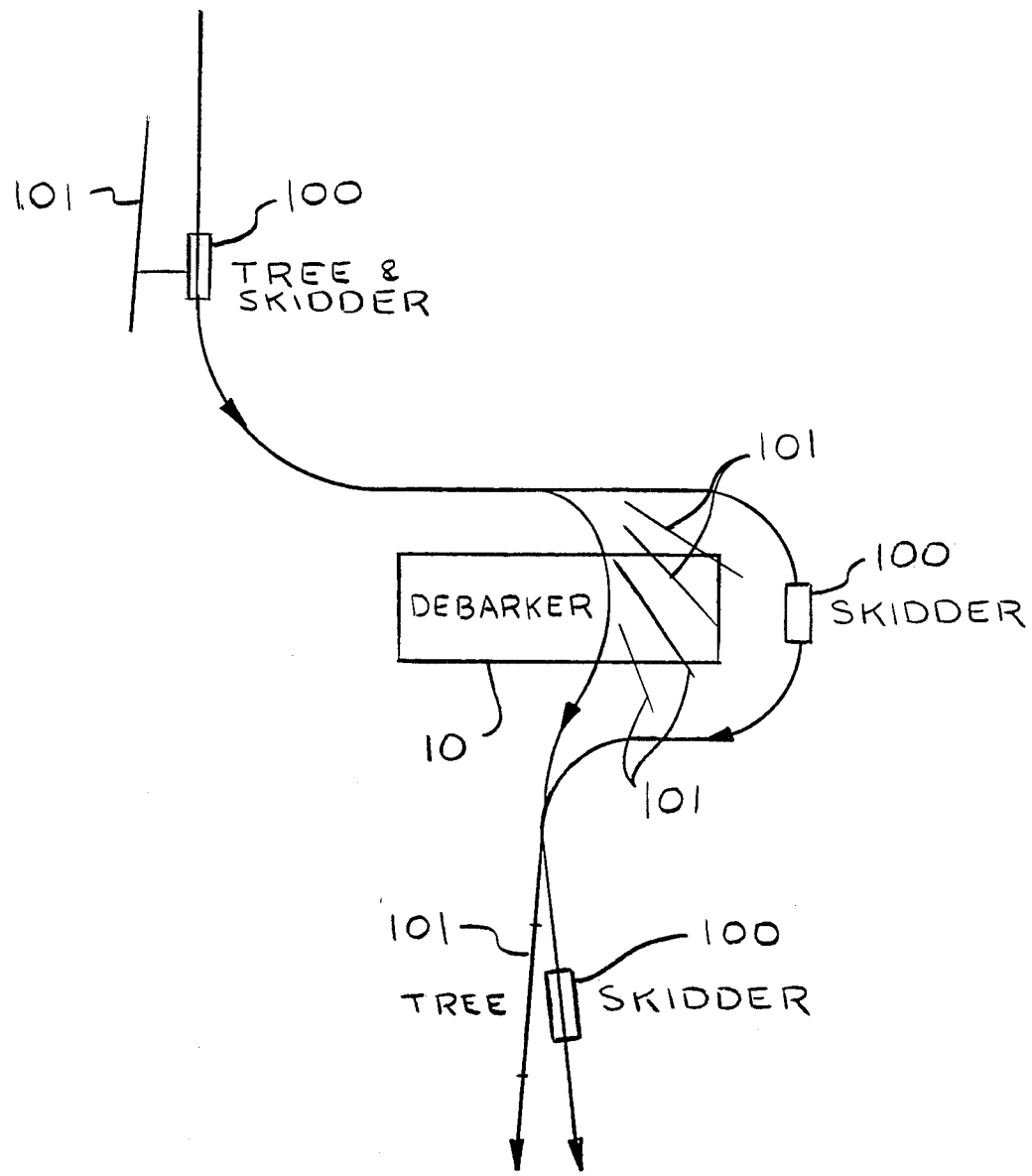

FIG. 8 is a schematic view of the apparatus 10 and a tree skidder 100 showing the positions of the tree 101 and it is dragged into the opening A and through space B by the skidder 100.

GENERAL DESCRIPTION

The present invention relates to an improved apparatus for debarking or limb removal from trees which comprises: a horizontally oriented frame means having an upper surface, lower surface, two opposed ends and two opposed sides between the ends; a first drum means having a longitudinal axis and horizontally mounted on the axis for rotation and between the opposed sides and between the ends of the frame means; a first set of flail means mounted on and along the axis of the first drum means; a beam means mounted on and above the upper surface of the frame means and cantilevered over the frame means and first drum means and between the ends and opposed sides of the frame means; a second drum means mounted on the beam means and having a longitudinal axis which is horizontal and in essentially parallel and spaced relationship to the axis of the first drum means such that there is an opening leading into a space between the first drum means and the second drum means; a second set of flail means mounted on and along the axis of the second drum means in a spacing which with the flail means of the first drum means provides the debarking or the limb removal from trees; and power means mounted on the frame means and connected to the first and second drum means for providing rotation of the first and second drum means and first and second set of flail means together for the debarking or limb removal, wherein at least one tree with limbs and bark can be moved into the opening and the space between the first and second drum means for debarking or limb removal.

Further, the present invention relates to an improved method for debarking or limb removal from trees which comprises: providing an apparatus which comprises: a horizontally oriented frame means having an upper surface, lower surface, two opposed ends and two opposed sides between the ends; a first drum means having a longitudinal axis and horizontally mounted on the axis for rotation and between the opposed sides and between the ends of the frame means; a first set of flail means mounted on and along the axis of the first drum means; a beam means mounted on and above the upper surface of the frame means and cantilevered over the frame means and first drum means and between the ends and opposed sides of the frame means; a second drum means mounted on the beam means and having a longitudinal axis which is horizontal and in essentially parallel and spaced relationship to the axis of the first drum means such that there is an opening leading into a space between the first drum means and the second drum means; a second set of flail means mounted on and along the axis of the second drum means in a spacing which with the flail means of the first drum means provides the debarking or the limb removal from trees; and power means mounted on the frame means and connected to the first and second drum means for providing rotation of the first and second drum means and first and second set of flail means together for the debarking or limb removal, wherein at least one tree with limbs and bark can be moved into the opening and the space between the first and second drum means for debarking or limb removal; and moving at least one tree into the opening and into the space between the first and second drum means in contact with the first and second set of flail means, whereby the limbs or bark are removed from the tree.

SPECIFIC DESCRIPTION

Figure 1:
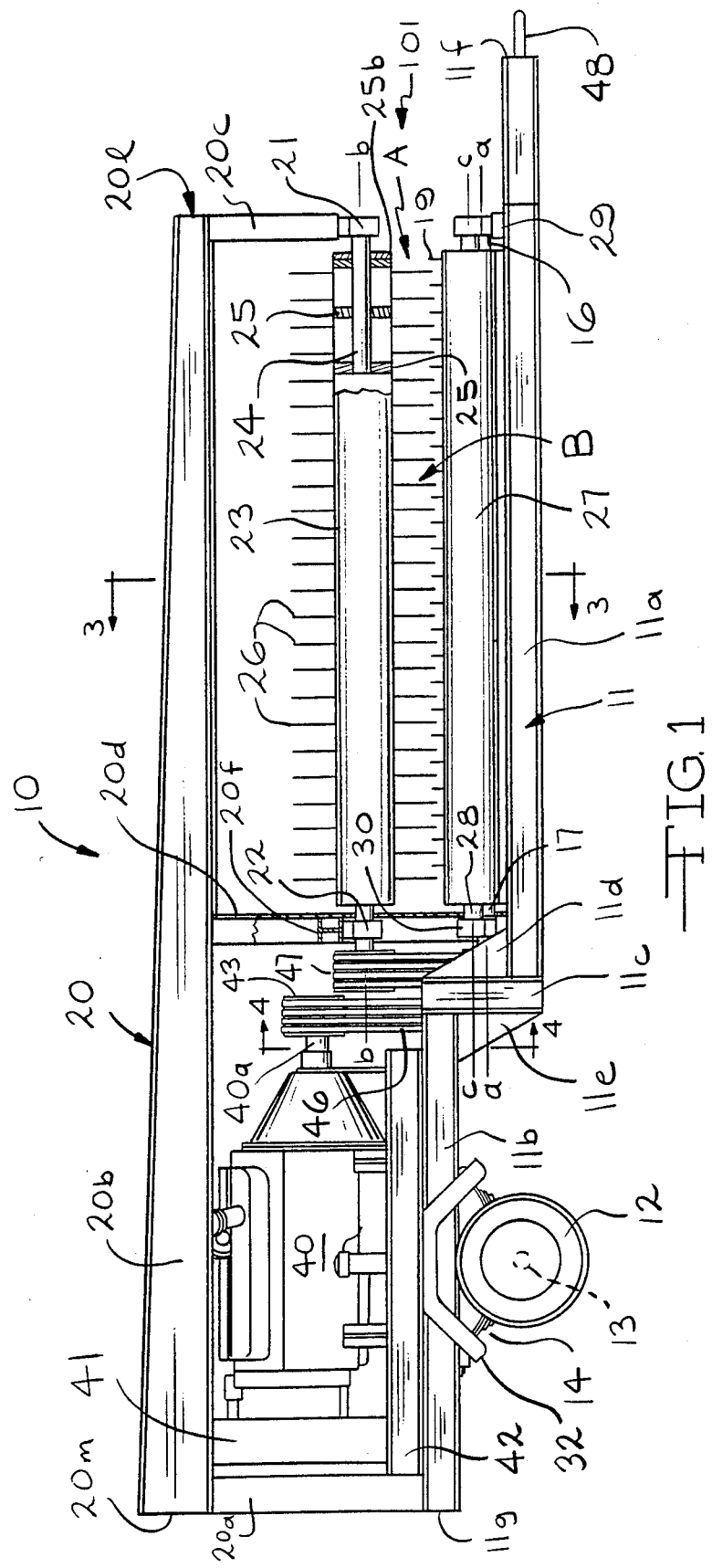
Figure 2:
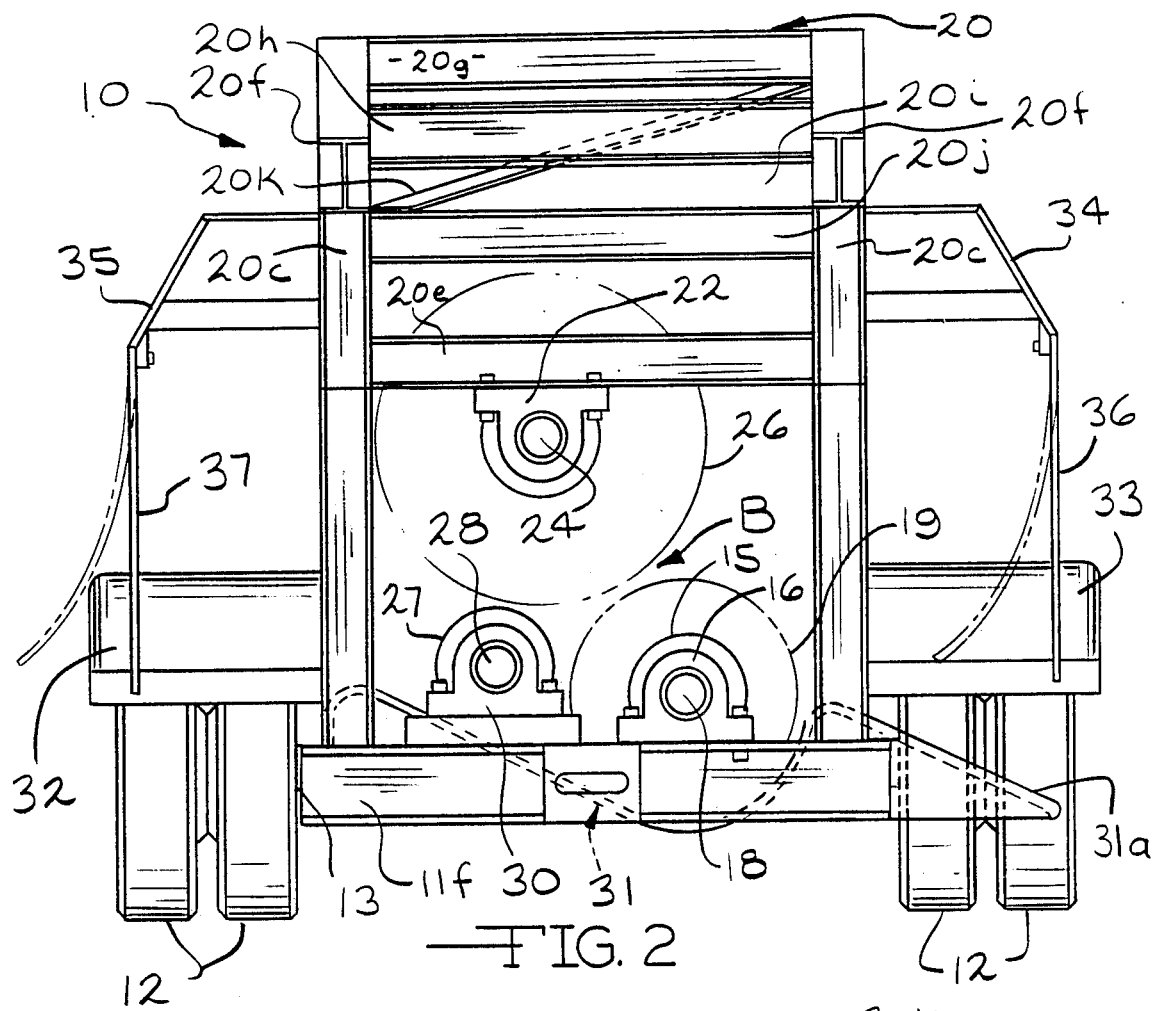
Figure 3:
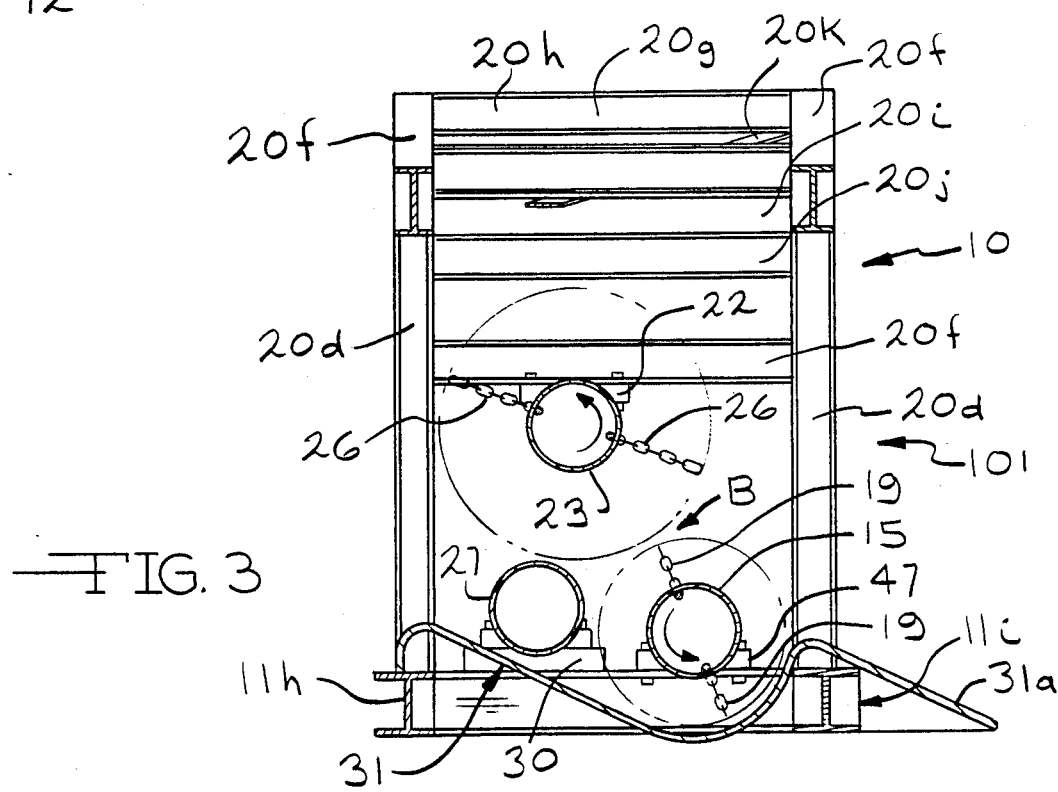

FIGS. 1 to 3 show the debarking and/or delimbing apparatus 10 of the present invention. A horizontally oriented frame 11 provides support and includes a lower portion 11a and an upper portion 11b separated by a step 11c. Gussets 11d and 11e hold the step 11c to the portions 11a and 11b respectively. Wheels 12 are supported by axle 13 which is mounted on upper portion 11b of the frame 11 by springs 14 in a known manner. The frame has opposed ends 11f and 11g and opposed sides 11h and 11i.

A first drum 15 is mounted on bearings 16 and 17 by means of a shaft 18 which is mounted on a longitudinal axis a—a between the ends 11f and 11g of the frame 11. Chain flails 19 are attached to the drum 15 preferably in the manner shown in FIGS. 5 to 7 discussed hereinafter. At one end 11g, a beam 20 is mounted on the frame 11 and has an upwardly extending portion 20a and a horizontally cantilevered portion 20b which extends above, over and in spaced relationship to the drum 15. Adjacent the other end 11f of the frame 11, downwardly depending portions 20c extend towards the frame 11. Bearing 21 is mounted between beam portions 20c on cross member 20e and bearing 22 is mounted between the depending portions 20d of the beam 20 on cross bar 20f such that the horizontal, longitudinal axis b—b of a drum 23 is parallel to the axis a—a of drum 15. The shaft 24 is supported by bearings 21 and 22. Spacers 25 support the drum 23 on shaft 24. Chain flails 26 are provided along the axis b—b on the drum 23.

An idler roller 27 is mounted on shaft 28 and supported by bearings 29 and 30 on longitudinal axis c—c which is parallel to axis a—a and b—b. A dished trough 31 is provided below and in closely spaced relationship to the first set of chain flails 19 so that limbs and bark falling onto the trough 31 will be further reduced in size. An integral ramp 31a allows the trees 101 to be moved into apparatus 10.

The portion 20b of beam 20 includes spaced apart horizontal I beams 20f above, between the ends 11f and 11g of the frame 11 and spaced horizontal cross beams 20g, 20h 20i and 20j. A diagonal beam 20k ties the ends 20l and 20m of the beam 20 together. The wheels 12 are preferably covered by fenders 32 and 33 projecting laterally from the beam 20. The beam 20 supports shields 34 and 35 which hold flexible covers 36 and 37 covering the first drum 15 and flails 19, second drum 23 and flails 26 and the idler roller 27.

A motor 40 with radiator 41 is mounted on beams 42 (one shown) with an extension 40a of the motor 40 crankshaft (not shown) mounting a first pulley 43 as shown in FIGS. 1 and 4. A second pulley 44 is mounted on extension 18a of shaft 18 supporting drum 15 below the first pulley 43. A third pulley 45 is mounted on extension 24a of shaft 24 of supporting drum 23. Belts 46 connect the first and second pulleys and belts 47 connect the second pulley 44 and third pulley 45. Thus rotation of the extension 40a causes rotation of the first and second drums 15 and 23 in the direction of the arrows shown in FIG. 3.

FIGS. 5 to 7 show the mounting of the chains 19 or 26 on the drums 15 or 23. Drum 15 is used for illustration. At one end of the drum 15 adjacent the motor 40 an end closure 50 is secured to the shaft 18 such as by welding and slides inside of the drum 15. Threaded openings (not shown) are provided in the end closure 50 for bolts 51 which pass through openings (not shown) perpendicular to the axis a—a in the drum 15. The openings are reinforced by plates 52. At the opposite end of the drum 15, the spacers 25 are secured to shaft 18 with slots 25a for rods 53. End closure plate 54 is secured to the end most spacer 25 by means of bolts 55 which pass into threaded openings (not shown) parallel to the axis a—a in the spacer 25a. The closure 54 has slots 56 which serve as guides along with the slots 25a for rods 53 when they are inserted. The slots 56 are positioned off center from rods 53 as shown in FIG. 6 to secure the rods 53 in place inside the frum 15.

In operation, the motor 40 is started which rotates the drums 15 and 23 and the flails 19 and 26. As shown in FIG. 8, a skidder 100 drags a tree or trees 101 to the aparatus 10. The tree 101 passes between the drums 15 and 23 and flails 19 and 26 and rides on idler roller 27 whereby limbs and/or bark are removed from the tree 101. The skidder 100 then removes the stripped tree 101.

The shafts 18 and 24 are preferably 3 inches (7.62 cm) in diameter and bearings 16, 17, 22, 27, 29, 30 are preferably of the pillow block type. The pulleys 43, 44 and 45 are of the sheave type having multiple grooves for the belts 46 and 47. The beams for the frame 10 and beam 20 are of the wide flange type. The length of the drums 15 and 23 is preferably about 8 feet (243.8 cm) and the widths are 9½" outside diameter (24.2 cm) and 8" inside diameter (20.3 cm). The upper chain 26 has a tip to tip diameter of about 24 inches (61 cm) and the lower flails 19 have a tip to tip diameter of about 18 inches (45.7 cm). The tips of chain flails are preferably almost touching. The motor is preferably an 8 cylinder diesel having a displacement of about 736 cubic inches (12.1 liters). The apparatus 10 overall has a weight of about 13,000 pounds (5,890 kilograms). A Tree having a diameter of up to about 36" or a group of trees having a cross-section similar to a single tree can be easily handled by the apparatus 10.

It will be appreciated that the motor 40 can be of any type. A large horsepower diesel engine is preferred. Also the wheels 12 and axle 13 can be eliminated and the apparatus 10 can be placed on skids. Where wheels 12 are used a hitch 48 for vehicle attachment is preferred. Various attachment means for the chain flails 19 and 26 can be used. Further, various connection means between the motor 40 and the drums 15 and 23 can be used such as gears; however, the pulleys 43 and 47 are the most economical and are thus peferred. All of these variations will be obvious to one skilled in the art.

Preferably the flails 19 and 26 are in the form of chains. Other types of flails such as lengths of cable can be used as is known to those skilled in the art.

It is intended that the foregoing description be only illustrative of the present invention and that the present invention be limited only by the hereinafter appended claims.

I claim:

1. An improved apparatus for debarking or limb removal from trees which comprises:
   (a) a horizontally oriented frame means having an upper surface, lower surface, two opposed ends and two opposed sides between the ends;
   (b) a first drum means having a longitudinal axis and horizontally mounted on the axis for rotation and between the opposed sides and between the ends of the frame means;
   (c) a first set of flail means mounted on and along the axis of the first drum means;

(d) a beam means mounted on and above the upper surface of the frame means and cantilevered over the frame means and first drum means and between the ends and opposed sides of the frame means;

(e) a second drum means mounted on the beam means and having a longitudinal axis which is horizontal and in essentially parallel and spaced relationship to the axis of the first drum means such that there is an opening leading into a space between the first drum means and the second drum means;

(f) a second set of flail means mounted on and along the axis of the second drum means in a spacing which with the flail means of the first drum means provides the debarking or the limb removal from trees; and (g) power means mounted on the frame means and connected to the first and second drum means for providing rotation of the first and second drum means and first and second set of flail means together for the debarking or limb removal, wherein at least one tree with limbs and bark can be moved into the opening and the space between the first and second drum means for debarking or limb removal.

2. The apparatus of claim 1 wherein an idler roller means is provided adjacent the first drum means and spaced below the second drum means so that the tree is supported for movement between the first and second drum means and first and second set of chain flail means.

3. The apparatus of claim 1 wherein a trailer hitch means is provided at one of the ends of the frame means adjacent the opening and wherein wheels are mounted on an axle attached to the frame means adjacent the other of the ends of the frame means.

4. The apparatus of claim 1 wherein the power means is an internal combustion engine with a first pulley means, wherein second and third pulley means are mounted on each of the axis of the first and the second drum means, respectively, adjacent the internal combustion engine and wherein the belt means are mounted on the first, second and third pulley means to drive the first and second drum means.

5. The apparatus of claim 4 wherein a shaft driven by the internal combustion engine extends essentially parallel and adjacent to the first and second drum means; wherein the first pulley means is mounted on the shaft which is above the second pulley means; wherein the second pulley means and first pulley means are connected by a belt means and wherein the second and third pulley means are connected by a belt means.

6. The apparatus of claim 3 wherein the frame means is stepped at a first portion of the frame means where the axle means attaches to the frame means and mounts the power means so that a second portion of the frame means adjacent the first drum means is closer to a ground level than the first portion of the frame means.

7. The apparatus of claim 3 wherein the second portion of the frame means is between about 8 and 15 inches from the ground level.

8. The apparatus of claim 1 wherein the flail means have links, wherein rods are mounted parallel to the axis of and inside the first and second drum means through one of the links and through an opening into an inside portion of the drum means; wherein the drum means are mounted on shafts along the axis and wherein end closure plate means are mounted at opposed ends of each of the first and drum means so as to hold the rods in place and the first and second sets of flail means in position on the first and second drum means.

9. The apparatus of claim 8 wherein the end closure plate at one end of each of the first and second drum means is removable such that the rods can be withdrawn parallel to the axis for removal and replacement of the chains.

10. The apparatus of claim 9 wherein the removable end closure plate means is provided with a semi-circular opening for guiding the rods parallel to the axis for mounting each of the first and second sets of flail means as the rods are inserted into the drum means.

11. The apparatus of claim 1 wherein shield means are mounted on the beam means adjacent the two opposed sides of the frame means to prevent limb or bark from flying from the apparatus.

12. The apparatus of claim 1 wherein the second set of flail means has a tip to tip diameter which is greater than tip to tip diameter of the first set of flail means and wherein the tips of the flail means pass in closely spaced relationship when the apparatus is in operation.

13. An improved method for debarking or limb removal from trees which comprises:
(a) providing an apparatus which comprises: a horizontally oriented frame means having an upper surface, lower surface, two opposed ends and two opposed sides between the ends;

a first drum means having a longitudinal axis and horizontally mounted on the axis for rotation and between the opposed sides and between the ends of the frame means;

a first set of flail means mounted on and along the axis of the first drum means;

a beam means mounted on and above the upper surface of the frame means and cantilevered over the frame means and first drum means and between the ends and opposed sides of the frame means;

a second drum means mounted on the beam means and having a longitudinal axis which is horizontal and in essentially parallel and spaced relationship to the axis of the first drum means such that there is an opening leading into a space between the first drum means and the second drum means;

a second set of flail means mounted on and along the axis of the second drum means in a spacing which with the flail means of the first drum means provides the debarking or the limb removal from trees; and power means mounted on the frame means and connected to the first and second drum means for providing rotation of the first and second drum means and first and second set of flail means together for the debarking or limb removal, wherein at least one tree with limbs and bark can be moved into the opening and the space between the first and second drum means for debarking or limb removal; and (b) moving at least one tree into the opening and into the space between the first and second drum means in contact with the first and second set of flail means, whereby the limbs or bark are removed from the tree.

14. The method of claim 13 wherein an idler roller means is provided adjacent the first drum means and spaced below the second drum means so that the tree is supported for movement between the first and second drum means and first and second set of flail means.

15. The method of claim 14 wherein the idler roller means and second drum means are mounted such that the tree is contacted by the first set of flail means before contacting the second set of flail means.

16. The method of claim 15 wherein a skidder apparatus is used to grasp at least one tree and move the tree into the opening and space between the first and second drum means and first and second sets of flail means.

17. The method of claim 16 wherein multiple of the trees are moved at one time between the drum means and first and second sets of flail means.

18. The apparatus of claim 1 wherein the flail means is a chain.

19. The method of claim 1 wherein the flail means is a chain.

* * * * *